United States Patent
Kanaya

(10) Patent No.: US 7,955,426 B2
(45) Date of Patent: *Jun. 7, 2011

(54) INK SET, AND RECORDING METHOD AND RECORDED MATTER USING THE SAME

(75) Inventor: Miharu Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,848

(22) Filed: Mar. 31, 2010

(65) Prior Publication Data

US 2010/0186625 A1    Jul. 29, 2010

Related U.S. Application Data

(63) Continuation of application No. 11/392,985, filed on Mar. 29, 2006, now Pat. No. 7,717,993.

(30) Foreign Application Priority Data

Mar. 29, 2005   (JP) ............... P.2005-094841

(51) Int. Cl.
     *C09D 11/02*   (2006.01)
(52) U.S. Cl. .................... 106/31.6; 106/31.65
(58) Field of Classification Search ........... 106/31.6, 106/31.65
     See application file for complete search history.

(56) References Cited

U.S. PATENT DOCUMENTS

| | | | |
|---|---|---|---|
| 6,399,674 B1 | 6/2002 | Kashiwazaki et al. | |
| 2001/0025586 A1 | 10/2001 | Watanabe | |
| 2003/0195274 A1 | 10/2003 | Nakamura et al. | |
| 2005/0284329 A1 | 12/2005 | Jackson et al. | |
| 2006/0075925 A1 | 4/2006 | Stoffel et al. | |

FOREIGN PATENT DOCUMENTS

| | | |
|---|---|---|
| JP | 2000-355667 | 12/2000 |
| JP | 2001-328282 | 11/2001 |

OTHER PUBLICATIONS

Computer-Generated English Translation of Specification and Claims and Patent Abstracts of Japan of JP 2001-328282 dated Nov. 27, 2001.
Computer-Generated English Translation of Specification and Claims and Patent Abstracts of Japan of JP 2000-355667 dated Dec. 26, 2000.

*Primary Examiner* — Jerry Lorengo
*Assistant Examiner* — Veronica Faison Gee
(74) *Attorney, Agent, or Firm* — Ladas & Parry LLP

(57) ABSTRACT

The present invention provides an ink set comprising at least two or more pigment inks different in color, wherein differences in average particle size between the inks different in color are 30 nm or less, the inks each have a sedimentation rate, as indicated by equation (I), of 15% or less, and differences in the sedimentation rate between the inks different in color are 4% or less:

$$\text{Sedimentation rate (\%)} = (S_0 - S_1)/S_0 \times 100 \quad \text{(I)}$$

wherein $S_0$ represents an "initial ink concentration", which is an absorbance at a wavelength of $\lambda$max (or at 500 nm when $\lambda$max is not detected) at the time when UV spectral characteristics are measured for a 1000-fold diluted solution of the ink; and $S_1$ represents an "ink concentration after sedimentation", which is an absorbance at a wavelength of $\lambda$max (or at 500 nm when $\lambda$max is not detected) at the time when UV spectral characteristics are measured for a 1000-fold diluted solution of a supernatant obtained by centrifuging the ink at 16500 G at $1.60 \times 10^7$ g·sec.

9 Claims, No Drawings

INK SET, AND RECORDING METHOD AND RECORDED MATTER USING THE SAME

This application is a continuation application of U.S. Ser. No. 11/392,985 filed on Mar. 29, 2006 (now U.S. Pat. No. 7,717,993), which claims priority to Japanese Patent Application No. 2005-094841 filed on Mar. 29, 2005; the contents of which are hereby incorporated by reference into the present application.

FIELD OF THE INVENTION

The present invention relates to an ink set, and more particularly to an ink set suitable for use in an ink jet recording system.

BACKGROUND OF THE INVENTION

The ink jet recording system is a printing method in which droplets of an ink are allowed to fly and adhere to a recording medium such as paper to perform printing. With recent innovative improvements in inkjet recording technology, the ink jet recording method has also come to be used in the field of high-definition image recording (printing) which has hitherto been achieved in the fields of photography and offset printing. Accordingly, high-quality recording has been required not only to plain paper and paper exclusive for ink jet recording (matte series and glossy series) which are generally used, but also to a recording medium such as paper for printing.

As the ink used in ink jet recording, there has been generally known an ink composition containing a coloring material acting as a coloring agent, water, a water-soluble solvent, a surfactant and the like.

As the coloring material, there is used a dye or a pigment, and particularly, a dye is used in a color ink in many cases, because of its high color saturation, transparency and high solubility in water. However, the dye is generally insufficient in terms of light resistance and gas resistance, and also has a problem in water resistance, because it is soluble in water. Accordingly, recorded matter in which recording has been made with the ink using the dye has the disadvantage of being poor in keeping properties of recorded images. In contrast, the pigment is a coloring material excellent in such light resistance, gas resistance and water resistance, so that development of pigment inks in which this coloring material characteristic is put to good use has been advanced. For example, there have been proposed an aqueous pigment ink in which the pigment is dispersed with a surfactant or a polymeric dispersing agent, an aqueous pigment ink using a self-dispersing pigment in which a water-dispersible functional group has been imparted to a surface of the pigment, and an aqueous pigment ink using fine colored particles in which the pigment has been coated with a water-dispersible resin.

In such pigment inks, the pigment particles (including the fine colored particles containing the pigment) are stably dispersed in ink solutions. However, when a ink cartridge is allowed to stand for a long period of time, or when the ink is left as being stored in an ink storage chamber of a printer, the pigment particles are gradually sedimented in the inside of the ink storage unit to generate a gradient in pigment particle concentration in the ink solution. For that reason, the difference in density is generated between ink density printed with the ink in an upper portion of the ink storage unit and that printed with the ink in a lower portion thereof. Accordingly, particularly in a recording method using two or more kinds of different colors, there has been the problem that not only the difference in density in monochrome is generated, but also the hue in color mixing changes to lose the color balance of a printed image to be originally obtained, resulting in deteriorated image quality.

Then, in order to prevent such deterioration of color balance, there has been proposed a method of specifying the degrees of sedimentation of respective inks of an ink set used for forming a color image, such as a yellow ink, a magenta ink and a cyan ink (see patent document 1).

Further, there has been proposed a method of substantially matching the degrees of sedimentation of respective inks by adjusting the compression void volume of a porous carrier impregnated with each ink in an ink cartridge to the sedimentation velocity of each ink (see patent document 2).

Patent Document 1: JP-A-2000-355667
Patent Document 2: JP-A-2001-328282

However, the degrees of sedimentation shown in patent document 1 are specified by combining the inks each selected increasing or decreasing the degree of sedimentation thereof according to a definite rule. According to this method, however, there has been the problem of insufficient improvement of deterioration of the gloss balance or color balance in image quality (photograph quality) on glossy media.

Further, the method of matching the degrees of sedimentation of respective inks by adjusting the compression void volume of a porous carrier impregnated with each ink in an ink cartridge to the sedimentation velocity of each ink is a means effective only for the ink cartridge equipped with the porous carrier. Accordingly, there has been the problem of the lack of flexibility.

SUMMARY OF THE INVENTION

The invention has been made in view of the above-mentioned problems.

Accordingly, and an object thereof is to provide a pigment ink set which can form images having excellent glossy texture on various recording media, particularly on a glossy medium, and which does not induce deterioration of image quality (deterioration of glossiness or color balance) caused by sedimentation of pigment particles in a pigment ink and is particularly suitable to use for an ink jet recording system.

Other objects and effects of the invention will become apparent from the following description.

As a result of extensive studies, the present inventors have obtained a finding that a pigment ink set comprising at least two kinds of pigment inks different in color, which is characterized in that the difference in average particle size between the inks different in color is 30 nm or less, that the sedimentation rate for each of the inks is 15% or less, and that the difference in sedimentation rate between the inks different in color is 4% or less, can solve the above-mentioned problems. The invention is based on such a finding, and the constitution of the invention is as follows:

(1) An ink set comprising at least two or more pigment inks different in color, wherein differences in average particle size between the inks different in color are 30 nm or less, the inks each have a sedimentation rate, as indicated by equation (I), of 15% or less, and differences in the sedimentation rate between the inks different in color are 4% or less:

$$\text{Sedimentation rate } (\%) = (S_0 - S_1)/S_0 \times 100 \quad\quad (I)$$

wherein $S_0$ represents an "initial ink concentration", which is an absorbance at a wavelength of λmax (or at 500 nm when λmax is not detected) at the time when UV spectral characteristics are measured for a 1000-fold diluted solution of the ink; and $S_1$ represents an "ink concentration after sedimentation", which is an absorbance at a wavelength of λmax (or at 500 nm when λmax is not detected) at the time when UV spectral characteristics are measured for a 1000-fold diluted solution of a supernatant obtained by centrifuging the ink at 16500 G at $1.60 \times 10^7$ g·sec;

(2) The ink set described in (1), wherein pigment particles in the above-mentioned pigment ink have an average particle size ranging from 50 to 150 nm;

(3) The ink set described in (1) or (2), wherein the above-mentioned pigment ink contains a pigment in an amount of 0.5 to 8% by weight;

(4) The ink set of any one of (1) to (3), wherein the above-mentioned pigment set contains at least a yellow ink, a magenta ink and a cyan ink, the yellow ink contains at least one pigment selected from the group consisting of C.I. Pigment Yellow 74, 109, 110, 128, 138, 147, 150, 155, 180 and 181, the magenta ink contains at least one pigment selected from the group consisting of C.I. Pigment Magenta 122, 202, 207, 209 and C.I. Pigment Violet 19, and the cyan ink contains at least one pigment selected from the group consisting of C.I. Pigment Blue 15, 15:1, 15:2, 15:3. 15:4 and 16;

(5) The ink set described in any one of (1) to (4), wherein the above-mentioned ink set contains a dispersion in which the pigment is dispersed in water with a water-insoluble resin;

(6) A recording method comprising allowing the ink set described in any one of (1) to (6) to adhere to a recording medium to perform printing;

(7) An ink jet recording method comprising ejecting droplets of the ink described in any one of (1) to (6) and allowing the droplets to adhere to a recording medium to perform printing; and (8) Recorded matter recorded by the recording method described in (6) or (7).

DETAILED DESCRIPTION OF THE INVENTION

The invention will be illustrated in detail below based on preferred embodiments thereof. The ink set of the invention is a pigment ink set comprising at least two kinds of pigment inks different in color, which is characterized in that the difference in average particle size between the inks different in color is 30 nm or less, that the sedimentation rate for each of the inks is 15% or less, and that the difference in sedimentation rate between the inks different in color is 4% or less.

It is clear to those skilled in the art that the sedimentation rate of the ink is adjustable by controlling the kinds and amounts of pigment and dispersing agent for dispersing the pigment, the particle size of pigment particles, the kinds and amounts of other respective components constituting the ink, and the like.

The average particle size in the invention is the volume average particle size measured by the use of a particle size distribution analyzer of a dynamic light scattering system, a laser diffraction scattering system or the like for an original ink solution or a sample obtained by diluting the ink with pure water to a concentration most suitable for the measurement. Specific examples of means for measuring the particle size include UPA-150, UPA-EX150 and MT3300EX manufactured by Microtrac, Inc., and LA-300 and LA-950 manufactured by Horiba, Ltd.

Further, the sedimentation rate in the invention is determined according to the following equation (I):

Sedimentation rate (%)=$(S_0-S_1)/S_0 \times 100$    (I)

$S_0$: Initial ink concentration=Absorbance at a wavelength of λmax (500 nm when λmax is not detected) at the time when UV spectral characteristics are measured for a 1000-fold diluted solution of the ink $S_1$: Ink concentration after sedimentation=Absorbance at a wavelength of λmax (500 nm when λmax is not detected) at the time when UV spectral characteristics are measured for a 1000-fold diluted solution of a supernatant obtained by centrifuging the ink at 16500 G at $1.60 \times 10^7$ g·sec Here, for the measurement of UV spectral characteristics, a spectrophotometer is used, and specific examples thereof include U-3000 and U-3300 manufactured by Hitachi, Ltd.

A centrifugal separator is used for the sedimentation, and any apparatus may be used as long as a revolution of about 10000 rpm can be obtained. A rotor is appropriately selected to perform adjustment so that the desired centrifugal force is applied to the ink. Specific examples of sedimentation tests include, for example, a method of performing centrifugation using Hitachi himac CR20B2 manufactured by Hitachi, Ltd., equipped with RPRS10 as the rotor, at $1.60 \times 10^7$ g·sec. The sedimentation rate of the ink is determined by an accelerated test of sedimentation obtained by such a method.

Respective constituents of the ink set will be illustrated in detail below.

Pigment

The pigment ink constituting the ink set of the invention contains a pigment as a coloring agent, and either a known inorganic pigment or organic pigment can be used as the pigment. Specific examples thereof include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180 and 198, C.I. Pigment Red 1, 3, 5, 8, 9, 16, 17, 19, 22, 38, 57:1, 90, 112, 122, 123, 127, 146, 184, 202 and 209, C.I. Pigment Violet 1, 3, 5:1, 16, 19, 23 and 38, C.I. Pigment Blue 1, 2, 15, 15:1, 15:2, 15:3, 15:4 and 16, and C.I. Pigment Black 1 and 7. A plurality of pigments can also be used in an ink having one color to form the color.

The particularly preferred ink set is an ink set comprising at least a yellow ink, a magenta ink and a cyan ink, wherein the yellow ink contains as a pigment at least one selected from the group consisting of C.I. Pigment Yellow 74, 109, 110, 128, 138, 147, 150, 155, 180 and 181, the magenta ink contains as a pigment at least one selected from the group consisting of C.I. Pigment Magenta 122, 202, 207, 209 and C.I. Pigment Violet 19, and the cyan ink contains as a pigment at least one selected from the group consisting of C.I. Pigment Blue 15, 15:1, 15:2, 15:3. 15:4 and 16. This makes it possible to enlarge the range of color reproduction when color images are formed. As a result, printed images of high quality can be obtained.

These pigments are preferably incorporated into the ink as a pigment dispersion in which they have been dispersed in an aqueous medium together with a dispersing agent such as a polymeric dispersing agent or a surfactant by the use of a ball mill, a roll mill, a bead mill, a high-pressure homogenizer, a high-speed stirring type disperser or the like, or as a pigment dispersion in which the pigments processed to self-dispersion type pigments which are dispersible and/or dissolvable in an aqueous medium with no dispersing agent by bonding dispersibility-imparting groups (hydrophilic functional groups and/or salts thereof) to surfaces of the pigments directly or indirectly through alkyl groups, alkyl ether groups, aryl groups or the like has been dispersed in an aqueous medium.

Examples of the dispersing agents include polymeric dispersing agents, and examples thereof include natural polymer compounds such as glue, gelatin and saponin, and synthetic polymer compounds such as polyvinyl alcohols, polypyrrolidones, acrylic resins (such as polyacrylic acid, an acrylic acid-acrylonitrile copolymer, a vinyl acetate-acrylic acid copolymer and a vinyl acetate-acrylic ester copolymer), styrene-acrylic acid resins (such as a styrene-acrylic acid copolymer, a styrene-methacrylic acid copolymer, a styrene-methacrylic acid-alkyl acrylate copolymer, a styrene-α-methylstyrene-acrylic acid copolymer, a styrene-α-methylstyrene-acrylic acid-alkyl acrylate copolymer and a styrene-vinyl acetate-acrylic acid copolymer), styrene-maleic acid-based resins, vinyl acetate-based copolymers such as a vinyl acetate-ethylene copolymer, vinyl acetate-fatty acid vinyl ester-ethylene copolymer resins, and salts thereof. The constitution of the copolymers may be any one of a random type, a block type and a graft type.

Further, examples of the surfactants which are used as the dispersing agents include anionic surfactants such as a fatty acid salt, a higher alkyldicarboxylic acid salt, a higher alcohol sulfuric ester salt and a higher alkylsulfonic acid salt, cationic surfactants such as a fatty acid amine salt and a fatty acid ammonium salt, nonionic surfactants such as a polyoxyalkyl ether, a polyoxyalkyl ester and a sorbitan alkyl ester.

Of these dispersing agents, particularly preferred is a water-insoluble resin. Specifically, this resin means a resin which comprises a block copolymer resin of a hydrophobic group-containing monomer and a hydrophilic group-containing monomer, contains at least a salt forming group-containing monomer, and has a solubility of less than 1 g based on 100 g of water at 25° C. after neutralization. The hydrophobic group-containing monomers include methacrylic esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate, vinyl esters such as vinyl acetate, vinylcyan compounds such as acrylonitrile and methacrylonitrile, and aromatic vinyl monomers such as styrene, α-methylstyrene, vinyltoluene, 4-t-butylstyrene, chlorostyrene, vinylanisole and vinylnaphthalene. They can be used either alone or as a mixture of two or more thereof. The hydrophilic group-containing monomers include polyethylene glycol monomethacrylate, polypropylene glycol monomethacrylate and ethylene glycol-polypropylene glycol monomethacrylate, and they can be used either alone or as a mixture of two or more thereof. The salt forming group-containing groups include acrylic acid, methacrylic acid, styrenecarboxylic acid and maleic acid, and they can be used either alone or as a mixture of two or more thereof. Further, a macromonomer such as a styrenic macromonomer having a polymerizable functional group on one end thereof or a silicone-based macromonomer, or another monomer can also be used together.

The water-insoluble resin is preferably used as a salt neutralized with an alkali neutralizing agent such as a tertiary amine such as trimethylamine or triethylamine, lithium hydroxide, sodium hydroxide, potassium hydroxide or ammonia, and one having a weight average molecular weight of about 10,000 to 150,000 is preferred in that the pigment is stably dispersed.

Further, for these pigments, the average particle size of pigment particles in the ink preferably ranges from 50 to 150 nm, in the viewpoints of storage stability of the ink, prevention of nozzle clogging, color development and glossiness on glossy media.

Furthermore, these pigments are preferably contained in the ink of the invention in an amount ranging from 0.5 to 8% by weight. When the content thereof is less than 0.5% by weight, print density (color development) is insufficient in some cases. On the other hand, exceeding 8% by weight results in the occurrence of defects in reliability such as deterioration of glossiness on glossy media, nozzle clogging and unstable ejection in some cases.

Ink Composition

In the ink set of the invention, an aqueous pigment ink is preferably used in which a main solvent of the ink is water, from the viewpoints of safety and handling properties. As the water, there is preferably used pure water such as ion exchanged water, ultrafiltrated water, water obtained by reverse osmosis or distilled water, or ultrapure water. In particular, the use of water which has been sterilized by ultraviolet irradiation, the addition of hydrogen peroxide, or the like is preferred in that mold or bacteria can be prevented from being developed to make it possible to store the ink for a long period of time.

Further, the ink set of the invention is an ink set suitable for an ink jet recording method, and preferably contains a water-soluble organic solvent having a wetting effect, in order to prevent clogging in the vicinity of a nozzle of an ink jet head. Specific examples thereof include polyhydric alcohols such as glycerol, 1,2,6-hexanetriol, trimethylolpropane, ethylene glycol, polypropylene glycol, diethylene glycol, triethylene glycol, tetraethylene glycol, pentaethylene glycol, dipropylene glycol, 2-butene-1,4-diol, 2-ethyl-1,3-hexane-diol and 2-methyl-2,4-pentanediol, saccharides such as glucose, mannose, fructose, ribose, xylose, arabinose, galactose, aldonic acid, glucitol (sorbitol), maltose, cellobiose, lactose, sucrose, trehalose and maltotriose, so-called solid wetting agents such as sugar alcohols, hyaluronic acids and ureas, alkyl alcohols having 1 to 4 carbon atoms such as ethanol, methanol, butanol, propanol, and isopropanol, 2-pyrrolidone, N-methyl-2-pyrrolidone, 1,3-dimethyl-2-imidazolidinone, formamide, acetamide, dimethyl sulfoxide, sorbit, sorbitan, acetin, diacetin, triacetin and sulfolane. One or two or more kinds of these water-soluble organic solvents having a wetting effect can be used, and are preferably contained in the ink in an amount of 10 to 50% by weight, from the viewpoints of securing proper physical properties (viscosity and the like) of the ink, print quality and securing reliability.

Further, in order to properly control penetrating properties of the ink into recording media and blurring, and to impart drying properties to the ink, it is preferred that a 1,2-alkanediol and/or a glycol ether is contained. Specific examples of the 1,2-alkanediols include 1,2-octanediol, 1,2-hexanediol, 1,2-pentanediol and 4-methyl-1,2-pentanediol. Specific examples of the glycol ethers include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether. On or two or more of these solvents can be used, and are preferably contained in the ink in an amount of 2 to 15% by weight, from the viewpoints of securing proper penetrating properties and drying properties.

Furthermore, in order to control wetting properties of the ink to recording media to impart uniform glossiness, and to obtain penetrating properties into recording media and print stability in the ink jet recording method, it is preferred that a surface tension adjuster is contained. As the surface tension adjuster, preferred is an acetylene glycol-based surfactant or a polyether-modified siloxane.

Example of the acetylene glycol-based surfactants include Surfynol 420, 440, 465, 485, 104 and STG (manufactured by Air Products and Chemicals Inc.), Olfine PD-001, SPC, E1004 and E1010 (manufactured by Nissin Chemical Industry Co., Ltd.), and Acetylenol E00, E40, E100 and LH (manufactured by Kawaken Fine Chemicals Co., Ltd.). Further, the polyether-modified siloxanes include BYK-346, 347, 348 and UV3530 (manufactured by Bic Chemie Corp.). Plural kinds of these may be used in the ink composition. The surface tension is preferably adjusted to 20 to 40 mN/m, and these are contained in the ink in an amount of 0.1 to 3.0% by weight.

Further, the ink of the invention preferably contains a pH adjustor.

As the pH adjustor, there can be used an alkali metal hydroxide such as lithium hydroxide, potassium hydroxide or sodium hydroxide, or an amine such as ammonia, triethanolamine, tripropanolamine, diethanolamine or monoethanolamine. Preferably, the ink contains at least one pH adjustor selected from the group consisting of an alkali metal hydroxide, ammonia, triethanolamine and tripropanolamine, and adjusted to pH 6 to 10. When the pH is outside this range, materials constituting an ink jet printer are adversely affected, or clogging recovery is deteriorated.

Further, there may be added an antifoaming agent, an antioxidant, an ultraviolet absorber, a preservative or fungicide and the like, as needed.

Although can be suitably used for writing things such as pens, stamps and the like, the ink composition of the invention can be more suitably used as an ink composition for ink jet recording. The term "ink jet recording system" as used in the invention means a system of ejecting an ink composition as droplets from a fine nozzle and adhering the droplets to a recording medium. The ink jet recording systems will be concretely described below.

As the first method, there is an electrostatic attraction system. This system is a system of applying a strong electric field between a nozzle and an accelerating electrode positioned in front of the nozzle to continuously eject the ink in a droplet form from the nozzle and giving a print information signal to deflecting electrodes while the ink droplets are flying between the deflecting electrodes, thereby performing printing, or a system of ejecting ink droplets in response to a print information signal without deflecting the course of the ink droplets.

The second method is a system of applying pressure to an ink liquid by means of a small-sized pump and vibrating mechanically a nozzle by using a quartz oscillator, thereby forcibly ejecting ink droplets. The ink droplets ejected are electrostatically charged, simultaneously with the ejection, and an information signal is given to deflecting electrodes while the ink droplets are flying between the deflecting electrodes, thereby performing printing.

The third method is a system using a piezoelectric element, and a system of simultaneously applying pressure and a print information signal to an ink liquid with the piezoelectric element, thereby ejecting ink droplets to perform recording.

The fourth method is a system of rapidly expanding the volume of an ink liquid by the action of thermal energy, and a system of heating the ink liquid at a microelectrode according to a print information signal to produce bubbles, thereby ejecting ink droplets to perform recording.

All of the above systems can be used in the ink jet recording method using the ink set of the invention.

The recorded matter of the invention is one in which recording has been performed using at least the above-mentioned ink set. The use of the ink composition of the invention provides this recorded matter as recorded matter which is excellent in color development and has glossy texture.

EXAMPLES

The present invention will be illustrated in greater detail with reference to the following examples, but the invention should not be construed as being limited thereto.
Preparation of Pigment Dispersions Coloring agent dispersions in each of which a coloring agent coated with a water-insoluble polymer was contained as dispersed particles were prepared by the following methods.
(Synthesis of Water-Insoluble Polymers 1 to 3)

Twenty parts by weight of an organic solvent (methyl ethyl ketone), 0.03 part by weight of a polymerization chain transfer agent (2-mercaptoethanol), a polymerization initiator and each monomer shown in Table 1 were put in a reaction vessel in which nitrogen gas replacement was sufficiently performed, and polymerization was conducted at 75° C. under stirring. Then, 0.9 part by weight of 2,2'-azobis(2,4-dimethylvarelonitrile) dissolved in 40 parts by weight of methyl ethyl ketone, based on 100 parts by weight of monomer components, was added thereto, followed by aging at 80° C. for 1 hour. Thus, polymer solutions were obtained.

TABLE 1

| Composition of Monomer Mixture (% by weight) | Water-Insoluble Polymer 1 | Water-Insoluble Polymer 2 | Water-Insoluble Polymer 3 |
| --- | --- | --- | --- |
| Methacrylic Acid | 20 | 15 | 20 |
| Styrene Monomer | 45 | 30 | 40 |
| Benzyl Methacrylate | | 20 | |
| Polyethylene Glycol Monomethacrylate (EO = 15) | 5 | 10 | |
| Polypropylene Glycol Monomethacrylate (PO = 9) | | 10 | 25 |
| Polyethylene Glycol-Propylene Glycol Monomethacrylate (EO = 5, PO = 7) | 10 | | 5 |
| Styrene Macromonomer | 20 | 15 | 10 |

(Pigment Dispersion Y1)

The polymer solution obtained as water-insoluble polymer 1 was dried under reduced pressure, and 5 parts of the resulting product was dissolved in 15 parts of methyl ethyl ketone. Using an aqueous solution of sodium hydroxide, the polymer solution was neutralized. Further, 15 parts of C.I. Pigment Yellow 74 was added, followed by kneading with a disperser while adding water.

After 100 parts of ion exchanged water was added to the resulting kneaded product, followed by stirring, methyl ethyl ketone was removed at 60° C. under reduced pressure, and water was partially removed, thereby obtaining an aqueous dispersion of the yellow pigment having a solid concentration of 20% by weight.
(Pigment Dispersion Y2)

The polymer solution obtained as water-insoluble polymer 2 was dried under reduced pressure, and 6 parts of the resulting product was dissolved in 45 parts of methyl ethyl ketone. Using an aqueous solution of sodium hydroxide, the polymer solution was neutralized. Further, 18 parts of C.I. Pigment Yellow 128 was added, followed by kneading with a disperser while adding water.

After 120 parts of ion exchanged water was added to the resulting kneaded product, followed by stirring, methyl ethyl ketone was removed at 60° C. under reduced pressure, and water was partially removed, thereby obtaining an aqueous dispersion of the yellow pigment having a solid concentration of 20% by weight.

(Pigment Dispersion Y3)

The polymer solution obtained as water-insoluble polymer 3 was dried under reduced pressure, and 5 parts of the resulting product was dissolved in 15 parts of methyl ethyl ketone. Using an aqueous solution of sodium hydroxide, the polymer solution was neutralized. Further, 15 parts of C.I. Pigment Yellow 180 was added, followed by kneading with a disperser while adding water.

After 100 parts of ion exchanged water was added to the resulting kneaded product, followed by stirring, methyl ethyl ketone was removed at 60° C. under reduced pressure, and water was partially removed, thereby obtaining an aqueous dispersion of the yellow pigment having a solid concentration of 20% by weight.

(Pigment Dispersion M1)

Pigment dispersion M1 was obtained in the same manner as in pigment dispersion Y1 with the exception that C.I. Pigment Red 122 was used in place of C.I. Pigment Yellow 74.

(Pigment Dispersion M2)

Pigment dispersion M2 was obtained in the same manner as in pigment dispersion Y2 with the exception that C.I. Pigment Violet 19 was used in place of C.I. Pigment Yellow 128.

(Pigment Dispersion M3)

Pigment dispersion M3 was obtained in the same manner as in pigment dispersion Y3 with the exception that C.I. Pigment Red 209 was used in place of C.I. Pigment Yellow 180.

(Pigment Dispersion C1)

Pigment dispersion C1 was obtained in the same manner as in pigment dispersion Y1 with the exception that C.I. Pigment Blue 15:3 was used in place of C.I. Pigment Yellow 74.

(Pigment Dispersion C2)

Pigment dispersion C2 was obtained in the same manner as in pigment dispersion Y2 with the exception that C.I. Pigment Blue 15:1 was used in place of C.I. Pigment Yellow 128.

(Pigment Dispersion C3)

Pigment dispersion C3 was obtained in the same manner as in pigment dispersion Y3 with the exception that C.I. Pigment Blue 15:4 was used in place of C.I. Pigment Yellow 180.

Preparation of Inks

Respective components were mixed in ratios shown in Table 2, and stirred at room temperature for 2 hours. Then, filtration was performed using a membrane filter having a pore size of 5 μm to prepare respective inks. The amounts added shown in Table 2 are all indicated in percentages by weight, and indicated in solid concentration for the pigment dispersions. Further, the term "balance" of ion exchanged water means that ion exchanged water is added to bring the total amount of ink to 100 parts.

TABLE 2

| Ink Composition | Ink Y1 | Ink Y2 | Ink Y3 | Ink Y4 |
|---|---|---|---|---|
| Dispersion Y1 | 30(4.6) | | | |
| Dispersion Y2 | | 40(5.3) | | |
| Dispersion Y3 | | | 30(3.8) | |
| Dispersion M1 | | | | |
| Dispersion M2 | | | | |
| Dispersion M3 | | | | |
| Dispersion C1 | | | | |
| Dispersion C2 | | | | |
| Dispersion C3 | | | | |
| C.I. Pigment Yellow 74 (Styrene-Acrylic Resin Dispersion) | | | | (4.5) |
| C.I. Pigment Red 122 (Styrene-Acrylic Resin Dispersion) | | | | |
| C.I. Pigment Blue 15:3 (Styrene-Acrylic Resin Dispersion) | | | | |
| Polymer 1 | 5 | | | 5 |
| Polymer 2 | | | | |
| Polymer 3 | | | 5 | |
| Polymer 4 | | | | |
| Polymer 5 | | | | |
| Glycerol | 10 | 10 | 15 | 10 |
| Triethylene Glycol | 5 | 3 | | 5 |
| 1,2-Hexanediol | 1 | 1 | 2 | 1 |
| Trimethylolpropane | 2 | 4 | | 2 |
| Urea | | | 3 | |
| TEGmBE | 2 | 2 | 2 | 2 |
| 2-Pyrrolidone | 1 | | 2 | 1 |
| Olfine E1010 | 1 | 0.5 | 0.7 | 1 |
| Surfynol 104 | 0.5 | 0.3 | 0.7 | 0.5 |
| Triethanolamine | 1 | 1 | 1 | 1 |
| EDTA | 0.02 | 0.02 | 0.02 | 0.02 |
| Proxel XL-2 | 0.3 | 0.3 | 0.3 | 0.3 |
| Ion Exchanged Water | Balance | Balance | Balance | Balance |
| Average Particle Size (nm) | 110 | 80 | 100 | 130 |
| Sedimentation Rate (%) | 12 | 10 | 10 | 18 |

| Ink Composition | Ink M1 | Ink M2 | Ink M3 | Ink M4 |
|---|---|---|---|---|
| Dispersion Y1 | | | | |
| Dispersion Y2 | | | | |
| Dispersion Y3 | | | | |
| Dispersion M1 | 30(4.6) | | | |
| Dispersion M2 | | 40(5.3) | | |
| Dispersion M3 | | | 25(4.3) | |
| Dispersion C1 | | | | |
| Dispersion C2 | | | | |
| Dispersion C3 | | | | |
| C.I. Pigment Yellow 74 (Styrene-Acrylic Resin Dispersion) | | | | |
| C.I. Pigment Red 122 (Styrene-Acrylic Resin Dispersion) | | | | (4.5) |
| C.I. Pigment Blue 15:3 (Styrene-Acrylic Resin Dispersion) | | | | |
| Polymer 1 | | | | 3 |
| Polymer 2 | | 3 | | |
| Polymer 3 | | | | |
| Polymer 4 | 3 | | | |
| Polymer 5 | | | | |
| Glycerol | 10 | 10 | 15 | 10 |
| Triethylene Glycol | 4 | 2 | | 5 |
| 1,2-Hexanediol | 1 | 1 | 2 | 1 |
| Trimethylolpropane | 2 | 4 | | 2 |
| Urea | | | 3 | |
| TEGmBE | 2 | 2 | 2 | 2 |
| 2-Pyrrolidone | 1 | | 2 | 1 |
| Olfine E1010 | 1 | 0.5 | 0.7 | 1 |
| Surfynol 104 | 0.5 | 0.3 | 0.7 | 0.5 |
| Triethanolamine | 1 | 1 | 1 | 1 |
| EDTA | 0.02 | 0.02 | 0.02 | 0.02 |
| Proxel XL-2 | 0.3 | 0.3 | 0.3 | 0.3 |
| Ion Exchanged Water | Balance | Balance | Balance | Balance |
| Average Particle Size (nm) | 100 | 90 | 120 | 155 |
| Sedimentation Rate (%) | 12 | 10 | 15 | 15 |

TABLE 2-continued

| Ink Composition | Ink C1 | Ink C2 | Ink C3 | Ink C4 | Ink C5 |
|---|---|---|---|---|---|
| Dispersion Y1 | | | | | |
| Dispersion Y2 | | | | | |
| Dispersion Y3 | | | | | |
| Dispersion M1 | | | | | |
| Dispersion M2 | | | | | |
| Dispersion M3 | | | | | |
| Dispersion C1 | 25(3.8) | | | | |
| Dispersion C2 | | 36(4) | 36(4) | | |
| Dispersion C3 | | | | 30(3) | |
| C.I. Pigment Yellow 74 (Styrene-Acrylic Resin Dispersion) | | | | | |
| C.I. Pigment Red 122 (Styrene-Acrylic Resin Dispersion) | | | | | |
| C.I. Pigment Blue 15:3 (Styrene-Acrylic Resin Dispersion) | | | | | (3.5) |
| Polymer 1 | 5 | | | | 5 |
| Polymer 2 | | | | | |
| Polymer 3 | | | | 3 | |
| Polymer 4 | | | | 3 | |
| Polymer 5 | | 5 | | | |
| Glycerol | 10 | 10 | 10 | 15 | 10 |
| Triethylene Glycol | 7 | 5 | 5 | | 5 |
| 1,2-Hexanediol | 1 | 1 | 1 | 2 | 1 |
| Trimethylolpropane | 2 | 4 | 4 | | 2 |
| Urea | | | | 3 | |
| TEGmBE | 2 | 2 | 2 | 2 | 2 |
| 2-Pyrrolidone | 1 | | | 2 | 1 |
| Olfine E1010 | 1 | 0.5 | 0.5 | 0.7 | 1 |
| Surfynol 104 | 0.5 | 0.3 | 0.3 | 0.7 | 0.5 |
| Triethanolamine | 1 | 1 | 1 | 1 | 1 |
| EDTA | 0.02 | 0.02 | 0.02 | 0.02 | 0.02 |
| Proxel XL-2 | 0.3 | 0.3 | 0.3 | 0.3 | 0.3 |
| Ion Exchanged Water | Balance | Balance | Balance | Balance | Balance |
| Average Particle Size (nm) | 80 | 85 | 85 | 100 | 100 |
| Sedimentation Rate (%) | 8 | 10 | 7 | 11 | 13 |

TEGmBE: Triethylene glycol monobutyl ether
EDTA: Disodium ethylenediaminetetraacetate Using the respective inks prepared in Table 2, the following evaluations were conducted for ink sets shown in Table 3.

TABLE 3

| | Ink Set | Yellow Ink | Magenta Ink | Cyan Ink |
|---|---|---|---|---|
| Example | Ink Set 1 | Ink Y1 | Ink M1 | Ink C1 |
| | Ink Set 2 | Ink Y2 | Ink M2 | Ink C2 |
| | Ink Set 3 | Ink Y2 | Ink M2 | Ink C3 |
| | Ink Set 4 | Ink Y3 | Ink M3 | Ink C4 |
| | Ink Set 5 | Ink Y1 | Ink M2 | Ink C3 |
| Comparative Example | Ink Set 6 | Ink Y2 | Ink M3 | Ink C2 |
| | Ink Set 7 | Ink Y2 | Ink M3 | Ink C3 |
| | Ink Set 8 | Ink Y4 | Ink M4 | Ink C5 |

(Test 1) Average Particle Size:

Using a particle size distribution analyzer (UPA-150 manufactured by Microtrac, Inc.), the particle size distribution was measured for a diluted solution obtained by diluting 1,000 times each ink with pure water to determine the volume average particle size. The results thereof are shown in Table 2.

(Test 2) Sedimentation Rate:

Using a centrifuge (Hitachi himac CR20B2 manufactured by Hitachi, Ltd. was equipped with an RPRS10 rotor), an ink was injected into a sedimentation pipe to 55 g including the sedimentation pipe, and centrifugation was performed at 16500 G at $1.60 \times 10^7$ g·sec. UV spectral characteristics of a 1000-fold diluted solution of the resulting supernatant and a 1000-fold diluted solution of the ink before centrifugation were measured by the use of U-300 manufactured by Hitachi, Ltd. to determine the sedimentation rate indicated by equation (I). The results thereof are shown in Table 2.

$$\text{Sedimentation rate (\%)} = (S_0 - S_1)/S_0 \times 100 \qquad (I)$$

$S_0$: Initial ink concentration=Absorbance at a wavelength of λmax (500 nm when λmax is not detected)

$S_1$: Ink concentration after sedimentation=Absorbance of a supernatant after centrifugation at a wavelength of λmax (500 nm when λmax is not detected)

(Test 3) Glossiness:

An ink cartridge for an ink jet printer, PX-V600 (manufactured by Seiko Epson Corporation) was filled with each ink, and mounted on the ink jet printer, PX-V600. Then, printing was carried out on EPSON Photo Paper <Gloss> (trade name: manufactured by Seiko Epson Corporation) at a resolution of 1440 dpi to form print images of 5 cm×5 cm patch patterns at the ink ratios (a) to (o) shown below, respectively, in one sheet of A4 paper at 70% duty for (a) to (g) and at an intermediate density of 50% duty for (h) to (o). For each patch, the 20° glossiness ($G_{20}$) was measured by the use of a glossmeter, GM-268 (manufactured by Konica Minolta Sensing, Inc.), and judgment was made from the results of the average value of the glossinesses of (a) to (j) on the basis of the criteria shown below:

(a) Yellow 100%
(b) Magenta 100%
(c) Cyan 100%
(d) Black 100%
(e) Yellow 50%, magenta 50%
(f) Yellow 50%, cyan 50%
(g) Cyan 50%, magenta 50%
(h) Yellow 30%, magenta 40%, cyan 30%
(i) Yellow 30%, magenta 30%, cyan 30%
(j) Yellow 40%, magenta 40%, cyan 20%
(k) Yellow 10%, magenta 40%, cyan 50%
(l) Yellow 40%, magenta 10%, cyan 30%
(m) Yellow 10%, magenta 50%, cyan 40%
(n) Yellow 50%, magenta 20%, cyan 30%
(o) Yellow 30%, magenta 30%, cyan 30%, black 10%

For the glossiness, it was found that the 60° glossiness generally used as an index of the specular gloss of printed matter did not agree with the apparent glossy texture, even when it showed a high value. As a result of extensive studies, it became clear that the glossiness at a view angle of 20° agreed with the apparent glossy texture. In the invention, therefore, the glossiness at a view angle of 20° was taken as an index value.

Further, intermediate density is frequently used in an image such as a natural drawing or a portrait, so that the evaluation at intermediate density was employed in view of the effect in an actual printed image.

A: The average of respective patches was $50 \leq G_{20}$.
B: The average of respective patches was $35 \leq G_{20} < 50$
C: The average of respective patches was $G_{20} < 35$ (Test 4) Gloss Balance:

An ink cartridge for an ink jet printer, PX-V600 (manufactured by Seiko Epson Corporation) was filled with each ink, and allowed to stand at room temperature for 6 months so that vibration is not given thereto with an ink feed opening directed downward. Then, each of the ink sets of Examples and Comparative Examples was mounted on the ink jet printer, PX-V600 (manufactured by Seiko Epson Corporation) according to an ink cartridge exchange method thereof, taking care not to give large vibration to the cartridge.

Using the patch pattern containing (a) to (j) used in test 3, printing was repeated on EPSON Photo Paper <Gloss> (trade name: manufactured by Seiko Epson Corporation) at a resolution of 720 dpi until the ink in the ink cartridge was consumed (ink end).

The 20° glossiness ($G_{20}$) of each patch of the resulting recorded matter was measured by the use of a glossmeter, GM-268 (manufactured by Konica Minolta Sensing, Inc.), and changes in glossiness from the start of printing to the ink end was examined for each patch. The changes in $G_{20}$ ($\Delta G_{20}$) were judged on the basis of the following criteria:

A: The maximum gloss difference from the start of printing to the ink end was $\Delta G_{20}<5$.

B: The maximum gloss difference from the start of printing to the ink end was $5 \leq \Delta G_{20}<10$.

C: The maximum gloss difference from the start of printing to the ink end was $10 \leq \Delta G_{20}$.

(Test 5) Color Balance:

For the recorded matter obtained in test 4, the hue (L*, a*, b*) from the start of printing to the ink end was examined for each patch by the use of a Gretag densitometer (manufactured by Gretag Macbeth), and from the results of the color difference ($\Delta E^*$) from just after the start of printing, judgment was made on the basis of the following criteria:

A: The maximum color difference from the start of printing to the ink end was $\Delta E^*<3$.

B: The maximum color difference from the start of printing to the ink end was $3 \leq \Delta E^*<6$.

C: The maximum color difference from the start of printing to the ink end was $6 \leq \Delta E^*$.

(Test 6) Storage Stability:

Fifty grams of each ink was put into an aluminum pack, and allowed to stand under the environment of 70° C. for 1 week. For whether foreign matter (sediment) was generated or not after standing, further for changes in physical properties (viscosity, surface tension, pH and particle size) when no foreign matter was generated, judgment was made on the basis of the following criteria:

A: No foreign matter was generated, and no physical properties were changed.

B: No foreign matter was generated, but the physical properties were somewhat changed.

C: Foreign matter was generated, or the physical properties were significantly changed.

(Test 7) Ejection Stability:

In printing in test 4, it was evaluated whether dot missing and flight deflection of each ink occurred or not, and how many cycles of printer cleaning which was conducted as a returning operation to normal printing were required when they occurred. Judgment was made on the basis of the following criteria:

A: No occurrence or one cycle of cleaning
B: Two to four cycles of cleaning
C: Five or more cycles of cleaning The results of evaluations of the above test 3 to 7 are summarized in Table 4.

TABLE 4

| | Ink Set | | | | | | | |
|---|---|---|---|---|---|---|---|---|
| | 1 | 2 | 3 | 4 | 5 | 6 | 7 | 8 |
| Test 3 | B | A | A | B | B | A | C | C |
| Test 4 | B | A | A | A | A | B | B | C |
| Test 5 | B | A | A | A | A | C | C | C |
| Test 6 | A | A | A | A | A | A | A | C |
| Test 7 | A | A | A | A | A | A | A | C |

As is apparent from Table 4, according to the ink set of the invention, there can be obtained images having excellent glossy texture to various recording media, particularly to glossy recording media, and deterioration of image quality (deterioration of glossiness or color balance) caused by sedimentation of pigment particles in the pigment ink is small.

Further, the ink set of the invention is excellent in storage stability, and good in ejection stability even in a state in which pigment particles in the ink have been sedimented, leading to high reliability. Accordingly, the ink set of the invention is an ink set suitable for use in the ink jet recording system. Furthermore, deterioration of image quality caused by sedimentation of pigment particles in the pigment ink is small even when no special device is made in an ink cartridge and the like, so that an ink set having high flexibility is obtained.

The invention is not limited to the above-mentioned embodiments, and is also applicable to applications, such as inks for writing things and inks for offset printing.

While the present invention has been described in detail and with reference to specific embodiments thereof, it will be apparent to one skilled in the art that various changes and modifications can be made therein without departing from the spirit and scope thereof.

This application is based on Japanese Patent Application No. 2005-094841 filed Mar. 29, 2005, the contents thereof being herein incorporated by reference.

What is claimed is:

1. An ink set comprising at least the following pigment inks for an ink jet printer and different in color: a yellow ink, a magenta ink and a cyan ink,
   wherein the pigment inks each have a sedimentation rate, as indicated by equation (I), of 15% or less, and differences in the sedimentation rate between the pigment inks different in color are 4% or less:

$$\text{Sedimentation rate (\%)} = (S_0 - S_1)/S_0 \times 100 \tag{I}$$

wherein
   $S_0$ represents an "initial ink concentration", which is an absorbance at a wavelength of λmax (or at 500 nm when λmax is not detected) at the time when UV spectral characteristics are measured for a 1000-fold diluted solution of the ink; and
   $S_1$ represents an "ink concentration after sedimentation", which is an absorbance at a wavelength of λmax (or at 500 nm when λmax is not detected) at the time when UV spectral characteristics are measured for a 1000-fold diluted solution of a supernatant obtained by centrifuging the ink at 16500 G at $1.60 \times 10^7$ g·sec, and
   wherein the ink set provides, when used for printing at a resolution of 1440 dpi, at the ink ratios (a) to (j) shown below, and at 70% duty for (a) to (g) and at an intermediate density of 50% duty for (h) to (j), print images of patch patterns having an average 20° glossiness ($G_{20}$) of all the patches of 35 or greater
   (a) Yellow 100%
   (b) Magenta 100%
   (c) Cyan 100%
   (d) Black 100%
   (e) Yellow 50%, magenta 50%
   (f) Yellow 50%, cyan 50%
   (g) Cyan 50%, magenta 50%
   (h) Yellow 30%, magenta 40%, cyan 30%
   (i) Yellow 30%, magenta 30%, cyan 30%
   (j) Yellow 40%, magenta 40%, cyan 20%.

2. An ink set comprising at least the following pigment inks for an ink jet printer and different in color: a yellow ink, a magenta ink and a cyan ink, wherein the pigment inks each have a sedimentation rate, as indicated by equation (I), of 15% or less, and differences in the sedimentation rate between the pigment inks different in color are 4% or less:

$$\text{Sedimentation rate (\%)} = (S_0 - S_1)/S_0 \times 100 \quad (I)$$

wherein $S_0$ represents an "initial ink concentration", which is an absorbance at a wavelength of λ-max (or at 500 nm when λ-max is not detected) at the time when UV spectral characteristics are measured for a 1000-fold diluted solution of the ink; and $S_1$ represents an "ink concentration after sedimentation", which is an absorbance at a wavelength of λ-max (or at 500 nm when λ-max is not detected) at the time when UV spectral characteristics are measured for a 1000-fold diluted solution of a supernatant obtained by centrifuging the ink at 16500 G at $1.60 \times 10^7$ g·sec, and wherein the ink set provides, when used for printing at a resolution of 720 dpi, at the ink ratios (a) to (j) shown below, and at 70 duty for (a) to (g) and at an intermediate density of 50% duty for (h) to (j), print images of patch patterns having a maximum difference in average 20° glossiness ($G_{20}$) of all the patches from the start of printing to the ink end of smaller than 10.

3. The ink set according to claim 2, wherein the print images show a color difference (ΔE*) from the start of printing to the ink end of less than 6.

4. The ink set according to claim 1, wherein differences in average particle size between the pigment inks different in color are 30 nm or less.

5. The ink set according to claim 1, wherein the pigment inks comprise pigment particles having an average particle size ranging from 50 to 150 nm.

6. The ink set according to claim 1, wherein the yellow ink contains at least one pigment selected from the group consisting of C.I. Pigment Yellow 74, 109, 110, 128, 138, 147, 150, 155, 180 and 181, the magenta ink contains at least one pigment selected from the group consisting of C.I. Pigment Magenta 122, 202, 207, 209 and C.I. Pigment Violet 19, and the cyan ink contains at least one pigment selected from
the group consisting of C.I. Pigment Blue 15, 15:1, 15:2, 15:3. 15:4 and 16.

7. The ink set according to claim 2, wherein differences in average particle size between the pigment inks different in color are 30 nm or less.

8. The ink set according to claim 2, wherein the pigment inks comprise pigment particles having an average particle size ranging from 50 to 150 nm.

9. The ink set according to claim 2, wherein the yellow ink contains at least one pigment selected from the group consisting of C.I. Pigment Yellow 74, 109, 110, 128, 138, 147, 150, 155, 180 and 181, the magenta ink contains at least one pigment selected from the group consisting of C.I. Pigment Magenta 122, 202, 207, 209 and C.I. Pigment Violet 19, and the cyan ink contains at least one pigment selected from the group consisting of C.I. Pigment Blue 15, 15:1, 15:2, 15:3. 15:4 and 16.

* * * * *